US009891879B2

(12) United States Patent
Amrhein et al.

(10) Patent No.: US 9,891,879 B2
(45) Date of Patent: Feb. 13, 2018

(54) ENABLING PROXIMITY-AWARE VISUAL IDENTIFICATION

(71) Applicant: International Business Machines Corporation, Armonk, NY (US)

(72) Inventors: Dustin K. Amrhein, Zachary, LA (US);
Nitin Gaur, Round Rock, TX (US);
Christopher D. Johnson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 14/868,570

(22) Filed: Sep. 29, 2015

(65) Prior Publication Data

US 2017/0090850 A1    Mar. 30, 2017

(51) Int. Cl.
| | |
|---|---|
| G08G 1/00 | (2006.01) |
| G09G 5/377 | (2006.01) |
| G06F 3/14 | (2006.01) |
| G06F 3/147 | (2006.01) |
| G06F 3/0484 | (2013.01) |
| G06F 3/0482 | (2013.01) |
| G06Q 50/30 | (2012.01) |
| H04N 1/00 | (2006.01) |
| A63F 13/335 | (2014.01) |
| G06T 19/00 | (2011.01) |

(52) U.S. Cl.
CPC .......... *G06F 3/1454* (2013.01); *G06F 3/0482* (2013.01); *G06F 3/04842* (2013.01); *G06F 3/147* (2013.01); *G06Q 50/30* (2013.01); *A63F 13/335* (2014.09); *A63F 2300/1031* (2013.01); *G06T 19/006* (2013.01); *H04N 1/00307* (2013.01)

(58) Field of Classification Search
CPC ...... A63F 13/12; A63F 13/216; A63F 13/335; A63F 2300/1031; G06F 11/0709; G06F 11/0742; G06T 19/006; H04N 1/00307
See application file for complete search history.

(56) References Cited

U.S. PATENT DOCUMENTS 7,080,124 B1 * 7/2006 Shankar ............... G11B 27/322
                                                                    709/206
9,104,537 B1 * 8/2015 Penilla ..................... G06F 17/00
(Continued)

FOREIGN PATENT DOCUMENTS

| EP | 2018032 A1 | 1/2009 |
|---|---|---|
| WO | 2006079939 A2 | 8/2006 |

*Primary Examiner* — Michael J Eurice
(74) *Attorney, Agent, or Firm* — Michael A. Petrocelli

(57) ABSTRACT

A computer implemented method and system for proximity aware identification includes determining a symbol for identification on a first device. The first device is configured to detect a second device in a specified proximity to the first device. The method and system includes displaying the symbol on the first device, and detecting the second device within the specified proximity. The first device sends an image including the symbol to the second device, and the second device receiving the image and displaying the symbol. Indicating a location of the second device on a display of the first device depicting a relative location of the first device to the second device using the symbol, wherein the first device and the second devices include the symbol for identification by users of the first and second devices.

14 Claims, 4 Drawing Sheets

(56) References Cited

U.S. PATENT DOCUMENTS

| | | | |
|---|---|---|---|
| 2004/0192383 A1* | 9/2004 | Zacks | H04L 63/102 455/557 |
| 2006/0003777 A1* | 1/2006 | Nonoyama | G01S 5/0072 455/457 |
| 2008/0113618 A1* | 5/2008 | De Leon | H04W 12/04 455/41.2 |
| 2009/0094247 A1* | 4/2009 | Fredlund | H04N 1/00153 |
| 2009/0132165 A1* | 5/2009 | Gabrielsson | E01C 19/004 701/300 |
| 2010/0251169 A1* | 9/2010 | Kimchi | G06Q 10/10 715/808 |
| 2011/0153362 A1* | 6/2011 | Valin | G06Q 20/105 705/3 |
| 2013/0084970 A1* | 4/2013 | Geisner | A63F 13/216 463/29 |
| 2013/0145482 A1* | 6/2013 | Ricci | G06F 9/54 726/28 |
| 2013/0227648 A1* | 8/2013 | Ricci | G06F 3/0484 726/3 |
| 2013/0293580 A1* | 11/2013 | Spivack | G06Q 30/0643 345/633 |
| 2014/0089134 A1* | 3/2014 | Linh | G06Q 30/0282 705/26.7 |
| 2014/0244595 A1* | 8/2014 | Cardonha | G06F 17/30477 707/689 |
| 2014/0306834 A1* | 10/2014 | Ricci | B60Q 1/00 340/902 |
| 2016/0027307 A1* | 1/2016 | Abhyanker | G08G 1/005 701/117 |
| 2016/0189435 A1* | 6/2016 | Beaurepaire | G05D 1/021 705/13 |

* cited by examiner

ENABLING PROXIMITY-AWARE VISUAL IDENTIFICATION

BACKGROUND

The present disclosure relates to a computer implemented method and system for identification between users in proximity to each other. Identification between two or more users in a crowded pedestrian or vehicular traffic area can be challenging. For instance, it can be difficult to identify a party even if a location is agreed upon since the location may have many people in the vicinity. Also, a car service can be similarly difficult to identify when many similar looking vehicles are queued for providing transportation services. Thus, when arranging for a vehicle transportation at a busy location or business location, or waiting to meet a contact at a busy location, for example, an airport, it can be difficult to properly identify the vehicle or person which a person is meeting. In one example, calling a party on a mobile device and describing what a person is wearing or in another instance holding a sign, or describing a vehicle is not always possible and is time consuming and inefficient. In one example, people can be in a common attire (e.g., customary dress, uniform, typical work attire) or a vehicle can be similar to many other vehicles or part of a fleet of common vehicles, making visual distinction and description difficult for identification purposes. In another example, a map on a mobile device display can depict the location of one or more devices and is typically not very effective when the users are in close proximity to each other as the identifiers (e.g., dots) on the map can appear over one another or as a cluster and are not effective for distinguishing direction when the users' are in close proximity.

SUMMARY

According to an aspect of the present invention, a computer implemented method for proximity aware identification between multiple users which includes determining a symbol for identification on a first device. The first device is configured to detect a second device in a specified proximity to the first device. The method includes displaying the symbol on the first device, and detecting the second device within the specified proximity. An image including the symbol is sent from the first device to the second device. The method includes indicating a location of the second device on a display of the first device depicting a relative location of the first device to the second device using the symbol. The first device and the second devices include the symbol for identification by users of the first and second devices.

In another aspect according to the present invention, a computer-implemented method for proximity aware identification between multiple users includes determining a symbol for identification on a first device. The first device is configured to detect a second device in a specified proximity to the first device. The symbol is displayed on the first device. The method includes detecting the second device within the specified proximity, and sending an image including the symbol from the first device to the second device, wherein the second device receives the image and displays the symbol. The method includes obtaining coordinates of the first device via a proximity technique, and indicating a location of the first device on a display of the second device depicting a relative location of the first device to the second device. The location of the first device is adjusted on the display of the second device based on movement of the first device. A location of the second device is indicated on a display of the first device depicting a relative location of the first device to the second device using the symbol. The first device and the second devices include the symbol for identification by users of the first and second devices, and the first device is used by a ride sharing service and the second device is used by a passenger utilizing the ride sharing service. The determining the symbol includes the ride sharing service selecting the symbol from a group of symbols and excluding symbols of the group which are in current use in a vicinity of the passenger using the second device.

In another aspect according to the present invention, a computer program product for proximity aware identification between multiple users includes a computer readable storage medium having program instructions embodied therewith. The computer readable storage medium is not a transitory signal per se, and the program instructions are executable by a computer to cause the computer to perform a method, comprising: determining a symbol for identification on a first device, the first device being configured to detect a second device in a specified proximity to the first device; displaying the symbol on the first device; detecting the second device within the specified proximity; sending an image including the symbol from the first device to the second device; and indicating a location of the second device on a display of the first device depicting a relative location of the first device to the second device using the symbol, wherein the first device and the second devices include the symbol for identification by users of the first and second devices.

In another aspect according to the present invention, a computer system for proximity aware identification between multiple users includes one or more computer processors, one or more computer-readable storage media, and program instructions stored on one or more of the computer-readable storage media for execution by at least one of the one or more processors. The program instructions including: determining a symbol for identification on a first device, the first device being configured to detect a second device in a specified proximity to the first device; displaying the symbol on the first device; detecting the second device within the specified proximity; sending an image including the symbol from the first device to the second device; and indicating a location of the second device on a display of the first device depicting a relative location of the first device to the second device using the symbol, wherein the first device and the second devices include the symbol for identification by users of the first and second devices.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawing are discussed forthwith below.

DETAILED DESCRIPTION

Figure 1:
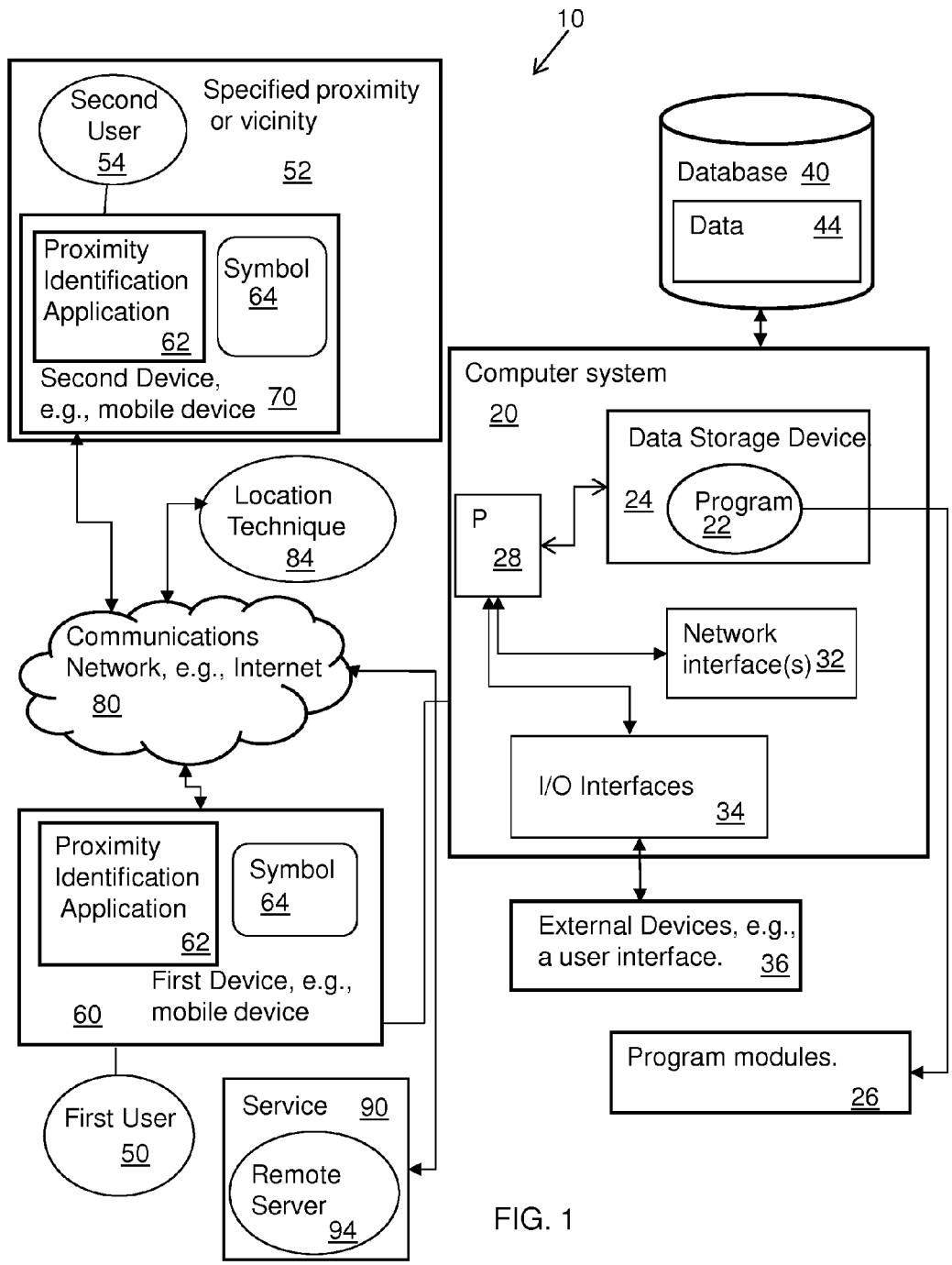
FIG. 1 is a schematic block diagram illustrating an overview of a system and methodology for proximity aware identification between two or more persons according to an embodiment of the disclosure.
Figure 2:
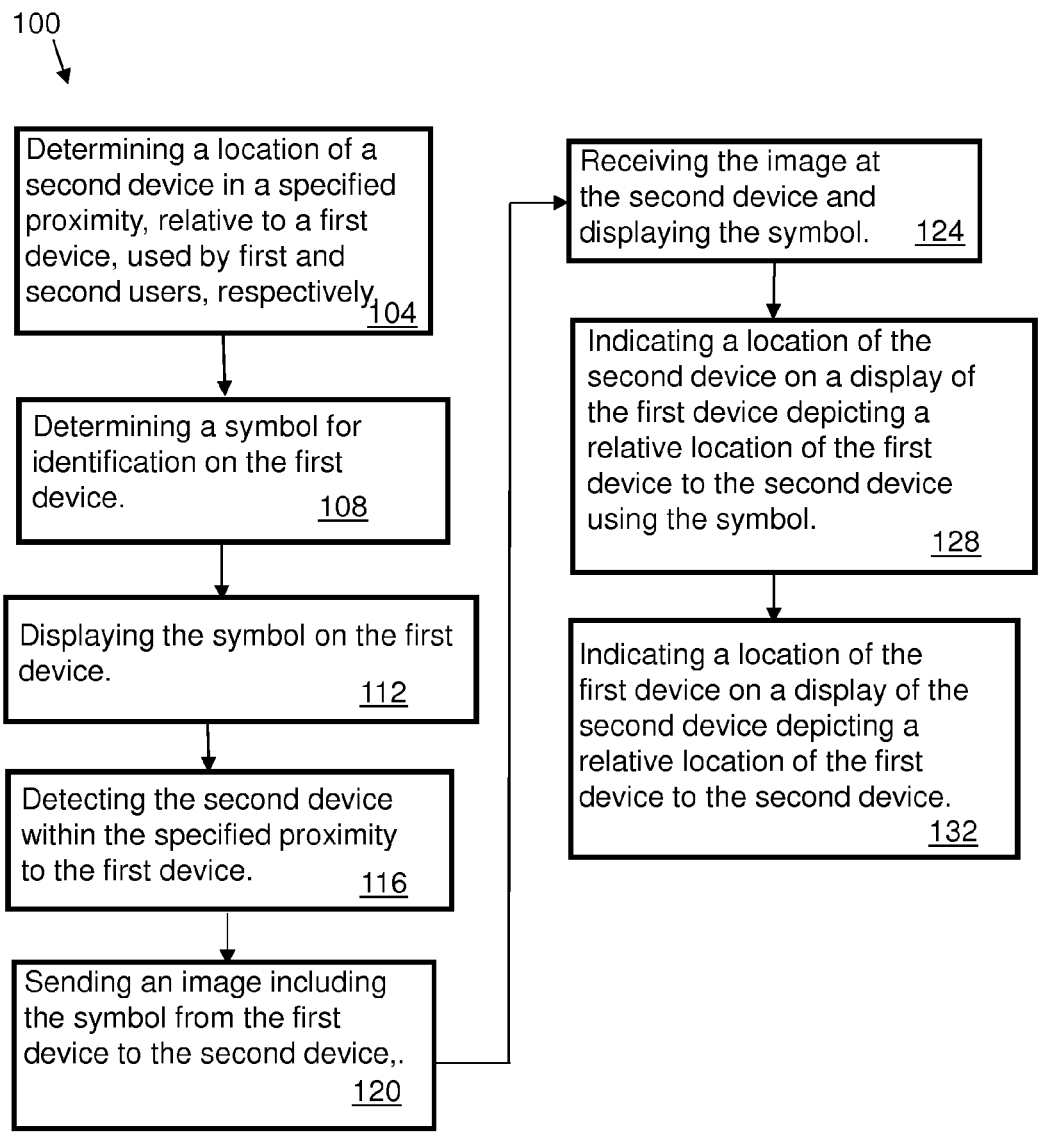
FIG. 2 is a flow chart illustrating a method for proximity aware identification using the system shown in FIG. 1, according to an embodiment of the disclosure.

Referring to FIGS. 1 and 2 a system 10 and method 100 according to an embodiment of the present disclosure for proximity aware identification for two or more users using electronic devices is described. The method 100 includes determining a location of a second device 70 used by a second user 54 relative to a first device 60 used by a first user 50, as in block 104. In the present example, the method includes the first user using the first device, moving to a location (or specified proximity or vicinity) of the second user using the second device. For example, the first user can be a car service 210 (or a ride sharing service) with a mobile device or car mounted computer device as a first device. In another instance, a first user can be a tour leader assembling a group of tourist. In another instance, the first and second users can be any two persons seeking to identify each other in a crowded or high density location. Other examples and applications will be described herein.

The locations of the first and second devices can be obtained using a positioning or location technique 84, for example, a GPS (Global Positioning System). The second user's location can be determined and the vicinity 52 of the second user identified. In one example, the second device can be a mobile device used by the second user who is a passenger utilizing the car service or ride sharing service.

The first and second devices 60, 70, respectively, each include a computer system 20, depicted in FIG. 1. The first and second devices 60, 70 can be a computer or a mobile device, or other types of computer devices. The first and second devices 60, 70 each include a proximity identification application 62 for generating a unique identifier or symbol, or can access a remote service (which can include one or more servers) using a communications network 80, e.g., the Internet. The proximity identification application 62 embodying the method of the present disclosure can be included on the first and second devices 60, 70, as shown in FIG. 1. Alternatively, the proximity identification application can be different versions for a client such as a client version, and a server version for a service provider. The proximity identification application can be a separate application, and alternatively can be an add on or part of (or integral with) an existing location application or service, and in another embodiment can be accessed remotely from a remote server 94 as part of a service 90.

The method 100 includes determining a symbol for identification on the first device, as in block 108. The symbol can be any visual representation for identification, for display on the first device, as in block 112. In one embodiment according to the present disclosure, the first user is a car service which can determine a symbol 64 which is not in use in the second user's vicinity. In other words, the symbol is chosen by the car service or ride sharing service to exclude other vehicles of the car service in the vicinity of the passenger. Alternatively, the symbol can be selected by the ride sharing service from a group of symbols excluding symbols of the group which are in current use in a vicinity of the passenger using the second device. In another example, the first or the second user can select a symbol from a group of symbols. The symbol can be verified as not being used in the vicinity or specified proximity of the second user, before the symbol is accepted by the users.

The method 100 includes detecting the second device 70 within a specified proximity 52 of the first user 50 and the first device 60, as in block 116. The second device can be located using the location technique 84.

Figure 3:
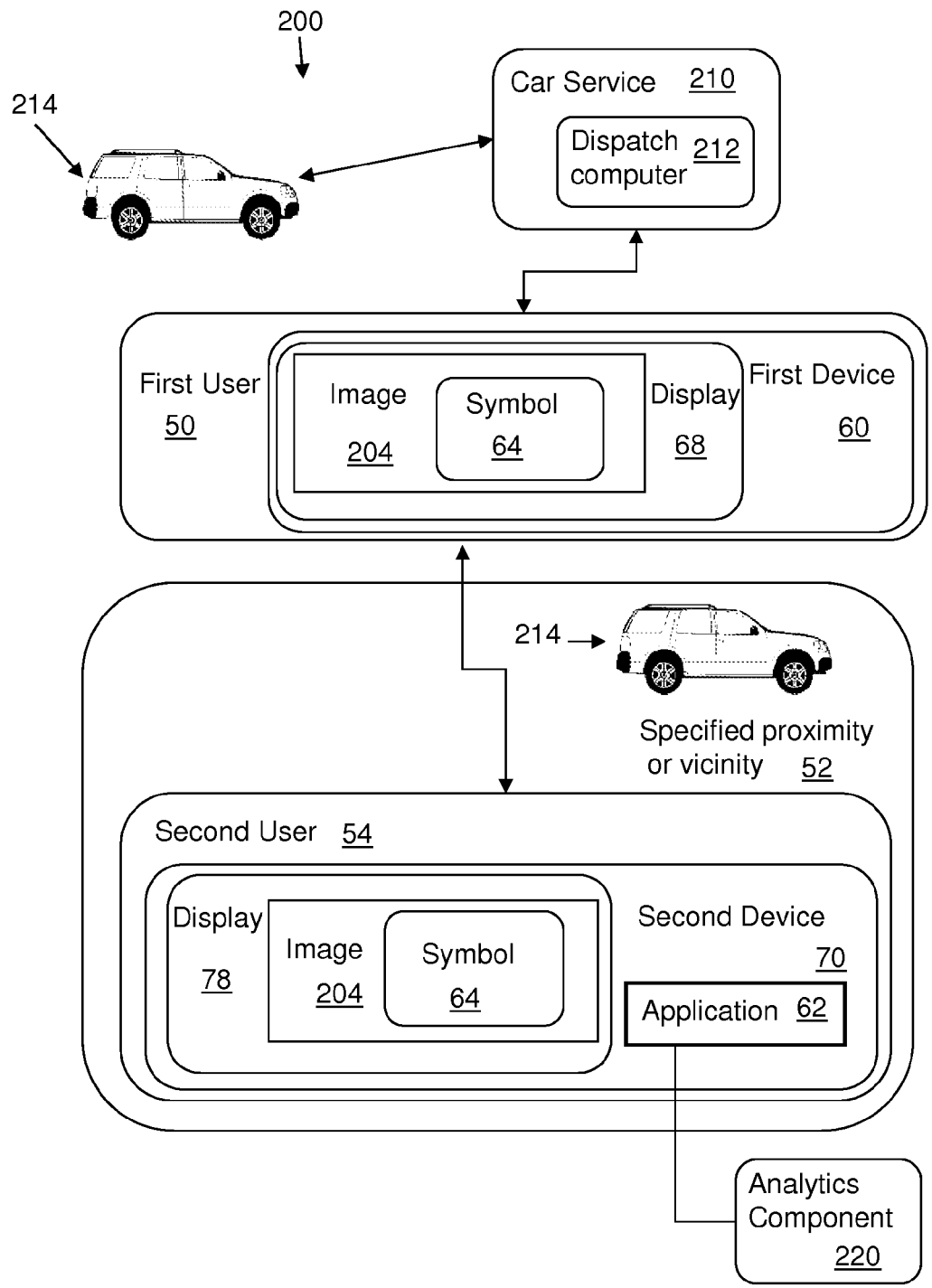
FIG. 3 is a schematic block diagram depicting a functional system for proximity aware identification according to an embodiment of the disclosure and relating to the methods and systems shown in FIGS. 1, 2, and 4.

An image 204 is sent including the symbol 64 from the first device 60 to the second device 70, as in block 120. In one example, the car service 210 can include a vehicle 214 which enters the vicinity 52 of the second user, as shown in FIG. 3.

The second device receives the image and displays the symbol, as in block 124. The second device 70 can display the image on a display 78.

A location of the second device is indicated on a display 68 of the first device 60 depicting a relative location of the first device to the second device using the symbol 64, as in block 128.

A location of the first device is indicated on a display of the second device depicting a relative location of the first device to the second device, as in block 132. The first device and the second devices include the symbol for identification by users of the first and second devices. Thus, the users' of the first and second devices 50, 54, respectively, each have the same symbol on their respective devices, and can, in one example, hold the device up for the other user to see the symbol and identify the other user.

In one embodiment, the method can obtain coordinates of the first device via a proximity technology technique, for example, GPS (Global Positioning System). The location of the first device can be mapped on the display on the second device, and the location of the first device can be adjusted relative to the second device based on movement of the first device.

In a related example to the above example, in one embodiment, using an analytics component 220 of the present disclosure, predictive analytics, for example based on congestion of pedestrian traffic, vehicle traffic, or an event, or known services at a location, can be applied to predict where the first user will be located with respect to the second user (and/or vice versa). In one example, the analytics component can be implemented on an analytics server, which may be remote to the physical location of the application. Thereby, predictively analyzing data pertaining to the location of the second device, the method and system of the present disclosure can approximate an arrival location for a user of the first device respective to the location of the second device.

For example, considering congestion (e.g., population density, pedestrian traffic, or vehicular traffic) in the specified vicinity, an estimated location of a user can be indicated using the symbol on a map displayed by a device. Correction can be implemented based on GPS. This can be particularly useful between updates of location from the GPS system.

In one embodiment, a first and second user can be embodied as vendor and vendee, a tour guide, or anyone or more persons looking to identify each other in a vicinity. The first and second users can verify the identity of each other by, for example, the first user sending a request to the second user for a confirmation from the second user before sending an image including a symbol from the first user to the second user. The confirmation can verify that the second user intends to contact the first user and is the party that wants an identification symbol for identifying the first user. Thus, the method and system of the present disclosure provides for verifying an identify of a first user of the first device to a second user of the second device, and can also verify an identify of the second user of the second device to the first user. As described above, the verification of identity can include sending a request from the first user from the first device to the second user of the second device, and receiving a confirmation from the second user verifying an identity of the second user, which can simply include the acceptance of the request.

Alternatively, profiles can be maintained by a service provider, providing the method of the present disclosure as a service. The first and second users can be verified based on their profiles maintained in the service provider's computer system. The stored profiles enable both users (or a plurality of users) to be verified, for example, a customer and an authorized service provider. The verified user can thus be sent an image including the symbol to a verified mobile device for the user. In one example, the service provider can generate a symbol for use by the users, and determine the other symbols in use in the vicinity to confirm that duplicate symbols are not being issues in the same vicinity. If the service provider determines that a symbol is already in use in the vicinity, another symbol can be generated for use in the same vicinity. Thus, the above technique ensures that the correct user receives the symbol, and that other users in the area or vicinity do not receive duplicate symbols. Also, the profiles can be analyzed to determine previously used and/or agreed upon symbols for identification. The process can then use a previously agreed upon symbol or previously used symbol to facilitate identification. In one embodiment, the verification of a user and the assignment of a symbol for identification can be determined and implemented by the analytics component.

Figure 4:
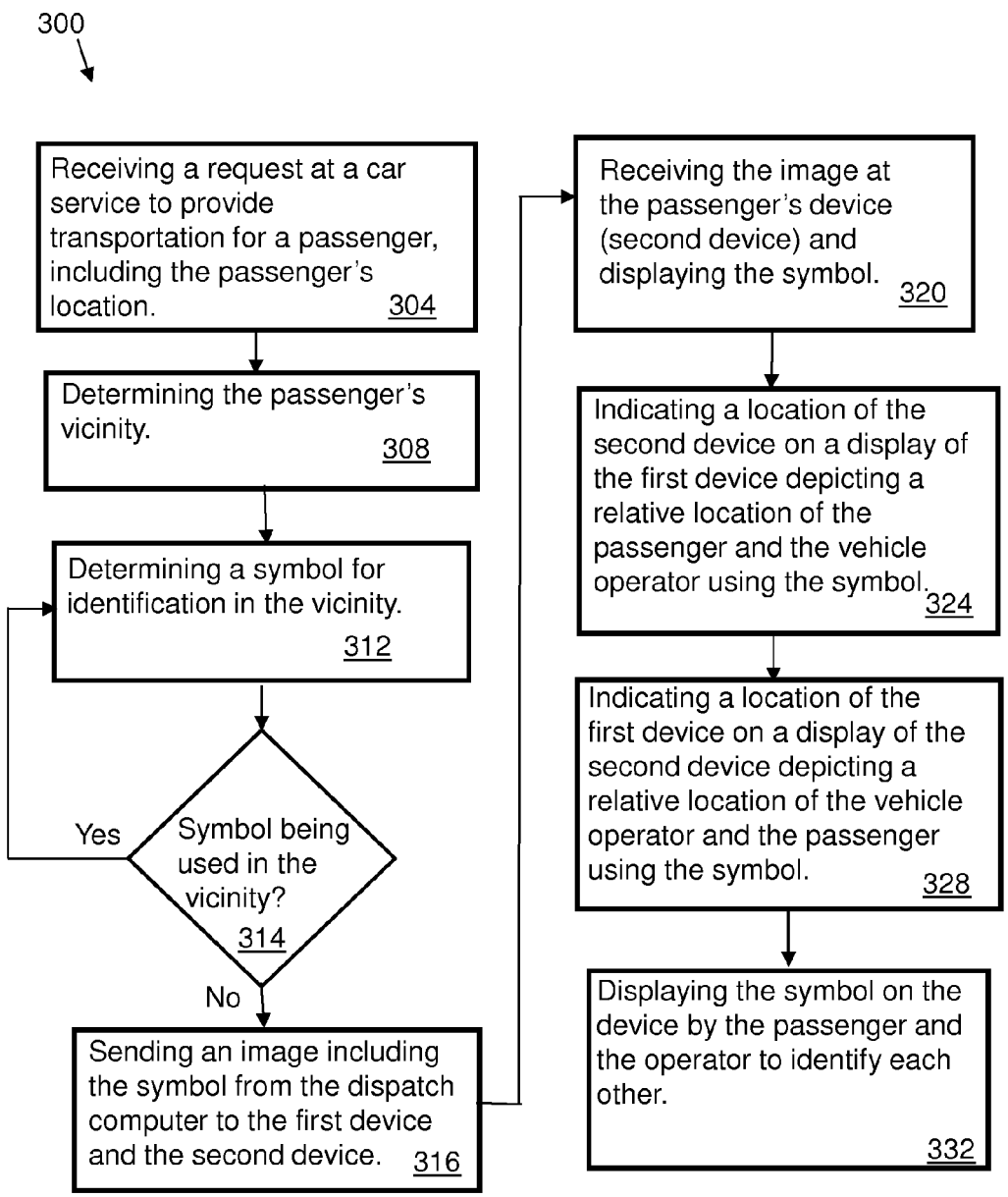
FIG. 4 is a flow chart illustrating another method for proximity aware identification using the systems shown in FIGS. 1 and 3, according to an embodiment of the disclosure.

Referring to FIGS. 1, 3 and 4 a method 300 based on the system 10 according to an embodiment of the present disclosure for proximity aware identification for two or more users using electronic devices is described. The present method 300 is directed toward a car service or ride sharing service, however, some of the steps of the method 300 are similar to the method 200 described above. In the present example, the method 300 includes a car or transportation (ride) service 210 receiving a request from a potential passenger to provide transportation which includes the passenger's location, as in block 304. The potential passenger is an embodiment of a second user 54. The car service, for example, includes a dispatch computer 212 for receiving requests from potential passengers and coordinating passenger pick up. Alternatively, a mobile device in a ride service vehicle can be used for this function. The dispatch computer can receive a request for transportation from a potential passenger, receive the passengers location, determine or suggest a symbol associated with the potential passenger which excludes symbols being used by the car service in the vicinity of the passenger.

After receiving the passenger's request and location, the car service can determine the passenger's vicinity (block 308). The car service can determine a symbol for use by the vehicle operator and the passenger, excluding any symbols already in use in the vicinity, as in block 312. If the symbol is being used in the passenger's vicinity (block 314) the method returns to block 312 to determine another symbol. If the symbol is not being used in the passenger's vicinity (block 314), the method proceeds to block 316.

The dispatch computer can send an image including the symbol to a vehicle operator's device as an embodiment of a first user 50 and a first device 60 who is operating the vehicle 214. The dispatch computer can also send the image including the symbol to a passenger's mobile device as an embodiment of a second user 54 and a second device 70. The vehicle operator in the vehicle 214 proceeds to the passenger.

The passenger receives the image 204 and symbol 64 on the display 78 of a device, e.g., the second device 70. The device can display the symbol 64 on the display 78, as in block 320.

The location of the passenger relative to the vehicle operator can be displayed on the passengers device using the symbol, as in block 324. Likewise, the location of the vehicle operator and vehicle relative to the passenger can be displayed on the vehicle operators device using the symbol, as in block 328. For example, two symbols can be shown on the device in relative position to each other. The vehicle operator's symbol can be adjusted to continually update the operator's location. If both the passenger and the operator are moving, both can be continually updated to depict their relative locations.

The passenger and vehicle operator can display the symbol displayed on their devices to others in the vicinity thereby using the symbol display to identify each other, as in block 332.

In one embodiment, using an analytics component of the present disclosure, predictive analytics, for example, based on traffic movement, can be applied to predict where the vehicle and vehicle operator of the vehicle is located. For example, considering traffic patterns, no parking or standing areas, emergency vehicles. Correction can be implemented based on GPS. This can be particularly useful between updates of location from the GPS system.

The present disclosure provides a process and a system for enabling a user to identify a vehicle or operator of a vehicle in a cluster of visually similar vehicles in a busy area. In one example, the present disclosure eliminates a potential passenger waiting for a car service from having to call the operator of the vehicle, receive a description of the vehicle or of the operator and try to identify each other. Further, the present disclosure enables users within a vicinity which is crowded with similar users to identify each other where typical map tracking would not enable identification because, for example, too many people are crowded in the immediate area or to many similar vehicles are in the same area.

The present disclosure provides a unique, matching visual notification, that two or more parties can use when they are in a specified proximity to one another. In one example, the parties can display the symbol on their devices in the direction of where the other party is located and the other party can do the same to facilitate identification between the parties.

In one embodiment, the symbol can be augmented to change visually as the parties approach each other, for instance, a change of color or flashing as the parties reach within a set distance from each other.

In one embodiment, a potential passenger of a car service is on a crowded street and numerous cars, taxis, and car service vehicles, the potential passenger can use the unique symbol according to the embodiments of the present disclosure. In one example, the symbol can be a bright green, flashing circle to use for mutual identification. The application can use a library of unique symbols unique to the service and can verify that the symbol will not be re-used in the same proximity. In one example, the car service vehicle can be indicated on the passenger's device within 100 feet of the potential passenger's location (e.g., using GPS or other proximity technology). The operator of the vehicle and the potential passenger can hold their respective devices in the air for mutual identification.

In one embodiment, a customer or potential passenger of a car service can have profiles which can be maintained in the service provider's computer system. The stored profiles enable a user to be verified and a car service operator to be selected, to provide an authorized service provider. The verified user can thus be sent an image including the symbol to a verified mobile device for the user. Also, the profiles can be analyzed to determine previously used and/or agreed upon symbols for identification. The process can then use a previously agreed upon symbol or previously used symbol to facilitate identification.

The method and process of the embodiments of the present disclosure can be implemented using the proximity identification application 62 shown in FIG. 1. The method can also be provided as a service which can be remote, for instance, including an application residing on a remote server exemplified by remote server 94.

The device or computer 70 may also be a mobile device. A mobile device is one embodiment of a device having a computer or computer system 20, which is depicted generically in FIG. 1. Other devices having a computer or described as a computer or computer system may include, for example, a Personal Data Assistant (PDA), a cell phone, or a notebook, a desktop computer, or the like. The device in the present disclosure can be configured to send and receive electronic communications. The computer system 20 is a generic representation of a computer which may be embodied in a device such as a hand held device, or can also represent a server for providing the method of the present disclosure as a service which can be accessible using the Internet or a network.

In another example incorporating the embodiments of the present disclosure, the first and/or second device can be embodied as wearable technology (e.g., a wearable). Wearables, for example, can be any wearable computer device, for example, a watch or a head device (e.g., a device worn on a user head with a display for the user). Other examples can include wearable devices that provide real time display of data. The first and/or second user can be wearing the wearable. The embodiments of the present disclosure can be implemented on the wearable(s) as a first and/or second device, 60, 70, respectively. In another embodiment, augmented reality techniques can be used where a map, image, or symbols, or indicator, can overlay an image on a device (such as a phone, watch, or camera, or tablet), to display a symbol as in the embodiments of the present disclosure.

In another example, the first and second users could be operators of vehicles and the vehicles have respective displays that can show a symbol for identification by the users to identify the users and their vehicles. The vehicles could include bicycles, motorcycles; mopeds, or cars. In another example, one user could have a mobile device and a second user could display a symbol on an second device mounted on their house to identify each other. In this example, a first user can be operating a vehicle and want to identify a second user in their home.

In one embodiment according to the present disclosure, the method 100 may be embodied in a program 22 (FIG. 1) embodied on a computer readable storage device, e.g., data storage device 24. The program 22 is executable by a processor 28 of a computer system 20 (to execute program steps, code, or program code). Additional data storage may also be embodied as a database 40 including data 44. The program or executable instructions may be offered as a service by a provider. The computer 20 and program 22 shown in FIG. 1 are generic representations of a computer and program that may be local to a user, or provided as a remote service, such as website accessible using a network (e.g., interacting with the Internet or cloud services). It is understood that the computer 20 also generically represents herein a computer device or a computer included in a device, such as a laptop or desktop computer, etc., or one or more servers, alone or as part of a datacenter. The computer system 20 can include a network interface 32, and input/output (I/O) interface(s) 34. The I/O interface 34 allows for input and output of data with an external device 36 that may be connected to the computer system. The network interface 32 may provide communications between the computer system and a computer network. The method steps and system components and techniques may be embodied in modules of the program 22 for performing the tasks of each of the steps of the method and system, which are generically represented in FIG. 1 as program modules 26. The program 22 and program modules 26 can execute specific steps, routines, sub-routines, instructions or code, of the program. The method of the present disclosure can be run locally on a device such as the mobile device, or can be run a service, for instance, on a remote server 94 which is accessed using the communications network 80.

It is understood that a computer or a program running on the computer may communicate with a server computer via a communications network. The communications network may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for proximity aware identification between multiple users, comprising:
    determining a symbol for identification by a service provider, and providing the symbol to a first device;
    detecting, by the service provider, a second device and determining a location of the second device in relation to the first device, the first device and the second device being mobile devices;
    selecting the symbol from a group of symbols excluding symbols of the group which are in current use in a vicinity of a second device;
    displaying the symbol on the first device;

detecting the second device within a specified proximity to the first device;

sending an image including the symbol from the first device or the service provider to the second device, receiving the image and displaying the symbol on the second device, whereby the same symbol is displayed on both the first and second devices; and indicating a location of the second device on a display of the first device depicting a relative location of the first device to the second device using the symbol, indicating a location of the first device on a display of the second device depicting the relative location of the first device to the second device, the first device and the second device include the same symbol for verification of identification by the respective users of the first and second devices.

2. The method of claim 1, further comprising:
selecting the symbol by a user of the first device.

3. The method of claim 1, further comprising:
selecting the symbol from a plurality of symbols by a user of the first device.

4. The method of claim 1, wherein the first device is used by a ride sharing service and the second device is used by a passenger utilizing the ride sharing service, and the method further comprising:
selecting the symbol by the ride sharing service from a group of symbols excluding symbols of the group which are in current use in a vicinity of the passenger using the second device.

5. The method of claim 1, further comprising a plurality of users using a plurality of respective devices.

6. The method of claim 1, further comprising:
predictively analyzing data pertaining to the location of the second device and approximating an arrival location for a user of the first device respective to the location of the second device.

7. The method of claim 1, further comprising:
verifying an identify of a first user of the first device to a second user of the second device, and verifying an identify of the second user of the second device to the first user.

8. The method of claim 7, further comprising:
sending a request from the first user from the first device to the second user of the second device; and
receiving a confirmation from the second user verifying an identity of the second user.

9. The method of claim 1, further comprising:
obtaining coordinates of the first device via a proximity technique;
mapping a location of the first device on the display on the second device; and
adjusting the location based on movement of the first device.

10. The method of claim 9, wherein the first device is used by a ride sharing service and the second device is used by a passenger utilizing the ride sharing service.

11. The method of claim 10, wherein the symbol is chosen by the ride sharing service to exclude other vehicles of the ride sharing service in a vicinity of the passenger.

12. A computer-implemented method for proximity aware identification between multiple users, comprising:
determining a symbol for identification by a service provider, and providing the symbol to a first device;
detecting, by the service provider, a second device and determining a location of the second device in relation to the first device, the first device and the second device being mobile devices;
selecting the symbol from a group of symbols excluding symbols of the group which are in current use in a vicinity of a second device;
displaying the symbol on the first device;
detecting the second device within a specified proximity to the first device;
sending an image including the symbol from the first device to the second device, the second device receiving the image and displaying the symbol;
obtaining coordinates of the first device via a proximity technique;
indicating a location of the first device on a display of the second device depicting a relative location of the first device to the second device;
adjusting the location of the first device on the display of the second device based on movement of the first device;
indicating a location of the second device on a display of the first device depicting a relative location of the first device to the second device using the symbol, the first device and the second devices include the symbol for identification by users of the first and second devices such that the first device and the second device include the same symbol for verification of identification by the respective users of the first and second devices, the first device being used by a ride sharing service and the second device being used by a passenger utilizing the ride sharing service, and wherein the determining the symbol for identification includes the ride sharing service selecting the symbol from a group of symbols and excluding symbols of the group which are in current use in a vicinity of the passenger using the second device.

13. A computer program product for proximity aware identification between multiple users, the computer program product comprising a computer readable storage medium having program instructions embodied therewith, wherein the computer readable storage medium is not a transitory signal per se, the program instructions executable by a computer to cause the computer to perform a method, comprising:
determining a symbol for identification by a service provider, and providing the symbol to a first device;
detecting, by the service provider, a second device and determining a location of the second device in relation to the first device, the first device and the second device being mobile devices;
selecting the symbol from a group of symbols excluding symbols of the group which are in current use in a vicinity of a second device;
displaying the symbol on the first device;
detecting the second device within a specified proximity to the first device;
sending an image including the symbol from the first device or the service provider to the second device, receiving the image and displaying the symbol on the second device, whereby the same symbol is displayed on both the first and second devices; and
indicating a location of the second device on a display of the first device depicting a relative location of the first device to the second device using the symbol, indicating a location of the first device on a display of the second device depicting the relative location of the first device to the second device, the first device and the second device include the same symbol for verification of identification by the respective users of the first and second devices.

14. A computer system for proximity aware identification between multiple users, the computer system comprising:
   one or more computer processors, one or more computer-readable storage media, and program instructions stored on one or more of the computer-readable storage media for execution by at least one of the one or more processors, the program instructions, comprising:
   determining a symbol for identification by a service provider, and providing the symbol to a first device;
   detecting, by the service provider, a second device and determining a location of the second device in relation to the first device, the first device and the second device being mobile devices;
   selecting the symbol from a group of symbols excluding symbols of the group which are in current use in a vicinity of a second device;
   displaying the symbol on the first device;
   detecting the second device within the specified proximity;
   sending an image including the symbol from the first device or the service provider to the second device, receiving the image and displaying the symbol on the second device, whereby the same symbol is displayed on both the first and second devices; and
   indicating a location of the second device on a display of the first device depicting a relative location of the first device to the second device using the symbol, indicating a location of the first device on a display of the second device depicting the relative location of the first device to the second device, the first device and the second device include the same symbol for verification of identification by respective users of the first and second devices.

* * * * *